(12) United States Patent
Suzuki

(10) Patent No.: US 7,729,215 B2
(45) Date of Patent: Jun. 1, 2010

(54) OPTICAL DISC DRIVE APPARATUS AND SERVO CONTROL METHOD FOR OPTICAL DISC DRIVE APPARATUS

(75) Inventor: Yuichi Suzuki, Kanagawa (JP)

(73) Assignee: Sony Corporation (JP)

( * ) Notice: Subject to any disclaimer, the term of this patent is extended or adjusted under 35 U.S.C. 154(b) by 499 days.

(21) Appl. No.: 11/880,481

(22) Filed: Jul. 20, 2007

(65) Prior Publication Data
US 2008/0025163 A1    Jan. 31, 2008

(30) Foreign Application Priority Data
Jul. 28, 2006    (JP)    ............ P2006-207035

(51) Int. Cl.
*G11B 7/00* (2006.01)
(52) U.S. Cl. .............. 369/44.32; 369/53.19
(58) Field of Classification Search ............. 369/44.32, 369/53.19
See application file for complete search history.

(56) References Cited

U.S. PATENT DOCUMENTS

| | | | |
|---|---|---|---|
| 6,754,154 B1* | 6/2004 | Takeda et al. | 369/53.19 |
| 7,116,610 B2* | 10/2006 | Ninomiya et al. | 369/44.32 |
| 7,233,554 B2* | 6/2007 | Onagi et al. | 369/44.32 |
| 7,394,737 B2* | 7/2008 | Maeda et al. | 369/53.19 |
| 7,477,576 B2* | 1/2009 | Yonezawa et al. | 369/44.32 |
| 2005/0063262 A1* | 3/2005 | Maeda et al. | 369/44.32 |
| 2005/0276190 A1* | 12/2005 | Kamiya et al. | 369/53.2 |
| 2006/0062106 A1* | 3/2006 | Tsuzuki et al. | 369/44.32 |

FOREIGN PATENT DOCUMENTS

JP    2002-092919 A    3/2002

* cited by examiner

*Primary Examiner*—Thang V Tran
(74) *Attorney, Agent, or Firm*—Lerner, David, Littenberg, Krumholz & Mentlik, LLP

(57) ABSTRACT

An optical disc drive apparatus may include an optical pickup that moves along a transportation shaft provided along a radial direction of an optical disc and picks up reflected light after emitting an optical beam via an objective lens to the optical disc; a drive section that controls the objective lens to adjust an angle of the optical beam; an angular velocity detection section that detects an angular velocity around the transportation shaft; storage means for storing coefficients from which the skew of the optical disc around a virtual axis perpendicular to the transportation shaft is calculated using the angular velocity; a skew estimation section that calculates a skew estimate value by multiplying the coefficient by the angular velocity; and a drive signal generation section that generates a drive signal based on the skew estimate value to enable the drive section to adjust the angle of the optical beam.

6 Claims, 4 Drawing Sheets

| TBL1 | |
|---|---|
| DISC RADIAL POSITION | RADIAL DISC SKEW COEFFICIENT |
| 24 | 2.1 |
| 24.1 | 2 |
| 24.2 | 1.9 |
| ⋮ | ⋮ |
| 58 | 0.6 |

FIG. 4A STANDARD SPEED MODE

| TBL2 | |
|---|---|
| DISC RADIAL POSITION | RADIAL DISC SKEW COEFFICIENT |
| 24 | 7.9 |
| 24.1 | 7.7 |
| 24.2 | 7.5 |
| ⋮ | ⋮ |
| 58 | 1.9 |

FIG. 4B DOUBLE SPEED MODE

OPTICAL DISC DRIVE APPARATUS AND SERVO CONTROL METHOD FOR OPTICAL DISC DRIVE APPARATUS

CROSS-REFERENCE TO RELATED APPLICATIONS

This application claims priority Japanese Patent Application No. JP 2006-207035 filed in the Japanese Patent Office on Jul. 28, 2006, the entire content of which is incorporated herein by reference.

BACKGROUND OF THE INVENTION

1. Field of the Invention

The present invention relates to an optical disc drive apparatus and servo control method for optical disc drive apparatus, and is preferably applied to an optical disc drive apparatus that supports a high density recording optical disc such as "Blu-ray Disc (Registered Trademark)", for example.

2. Description of Related Art

An optical disc drive apparatus rotates an optical disc at high speed to record or reproduce information from the optical disc. Since the optical disc drive apparatus precisely performs a focus control and a tracking control for an optical pickup, a laser light from the optical pickup is precisely emitted to a track on a signal recording surface of the optical disc.

Some optical disc drive apparatuses are designed to emit, from the optical pickup, the laser light to the signal recording surface of the optical disc at an appropriate angle. Accordingly, its tilt actuator performs a tilt control to correct the angular displacement of an objective lens of the optical pickup with respect to the optical disc.

For example, Patent Document 1 (see Jpn. Pat. Laid-open Publication No. 2002-92919 [Page 4]) discloses an optical disc drive apparatus which performs a tilt control: The optical disc drive apparatus detects the acceleration of an external force against its body and then detects a radial tilt based on a distance from the center of the optical disc to a point where the laser light is emitted, a rotation speed of the optical disc and the acceleration.

SUMMARY OF THE INVENTION

In that manner, the optical disc drive apparatus rotates the optical disc at high speed. Accordingly, the optical disc can be skewed or tilted by the Gyroscopic Precession when an external force is applied to the optical disc drive apparatus.

The method of detecting the radial tilt from the acceleration can detect the acceleration of the external force. However, it may not be able to detect the skew of the optical disc arising from the Gyroscopic Precession. This means that the process of the tilt control may have difficulty in correcting the angular displacement. Accordingly, the optical disc drive apparatus may not be able to precisely record and reproduce information from the optical disc.

The present invention has been made in view of the above points and is intended to provide an optical disc drive apparatus and servo control method for optical disc drive apparatus that precisely record and reproduce information from the optical disc.

In one aspect of the present invention, an optical disc drive apparatus may include an optical pickup that moves along a transportation shaft provided along a radial direction of a rotatable optical disc and picks up reflected light after emitting an optical beam via an objective lens to a signal recording surface of the optical disc; a drive section that controls the objective lens to adjust an angle of the optical beam emitted to the optical disc; an angular velocity detection section that detects an angular velocity around the transportation shaft when an external force is applied; storage means for previously storing coefficients from which the degree of skew of the optical disc around a virtual axis perpendicular to the transportation shaft is calculated using the angular velocity, the skew of the optical disc arising from the external force; a skew estimation section that calculates a skew estimate value of the optical disc by multiplying the coefficient acquired from the storage means by the angular velocity detected by the angular velocity detection section; and a drive signal generation section that generates a drive signal based on the skew estimate value and supplies the drive signal to the drive section to adjust the angle of the emitted optical beam in accordance with the skew estimate value.

In this manner, the skew of the rotating optical disc, caused by the external force as Gyroscopic Precession, may be estimated as the skew estimate value using the previously-calculated coefficients and the detected angular velocity. Accordingly, the servo control based on the skew estimate value may control the angle of the objective lens as precisely as when using the actual skew values.

In another aspect of the present invention, a servo control method of an optical disc drive apparatus may include an angular velocity detection step of detecting, when an external force is applied, an angular velocity around a transportation shaft on which moves an optical pickup in a radial direction of a rotatable optical disc, the optical pickup being used to pick up reflected light after emitting an optical beam via an objective lens to a signal recording surface of the optical disc; a skew estimation step of calculating a skew estimate value of the optical disc by multiplying a coefficient acquired from storage means by the angular velocity detected by the angular velocity detection step, the storage means previously storing the coefficients from which the degree of skew of the optical disc arising from the external force around a virtual axis perpendicular to the transportation shaft is calculated using the angular velocity; and a drive signal generation step of generating a drive signal based on the skew estimate value and supplies the drive signal to a drive section that controls the objective lens to adjust an angle of the optical beam emitted to the optical disc, to adjust, in accordance with the skew estimate value, the angle of the emitted optical beam as a servo control.

In this manner, the skew of the rotating optical disc, caused by the external force as Gyroscopic Precession, may be estimated as the skew estimate value using the previously-calculated coefficients and the detected angular velocity. Accordingly, the servo control based on the skew estimate value may control the angle of the objective lens as precisely as when using the actual skew values.

Thus, the skew of the rotating optical disc, caused by the external force as Gyroscopic Precession, may be estimated as the skew estimate value using the previously-calculated coefficients and the detected angular velocity. Accordingly, the servo control based on the skew estimate value may control the angle of the objective lens as precisely as when using the actual skew values. As a result, the optical disc drive apparatus and the servo control method thereof can precisely record or reproduce information from the optical disc.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 4A and 4B are schematic diagrams illustrating radial disc skew coefficient tables;

DETAILED DESCRIPTION

An embodiment of the present invention will be described in detail with reference to the accompanying drawings.

(1) Configuration of an Optical Disc Drive Apparatus

Figure 1:
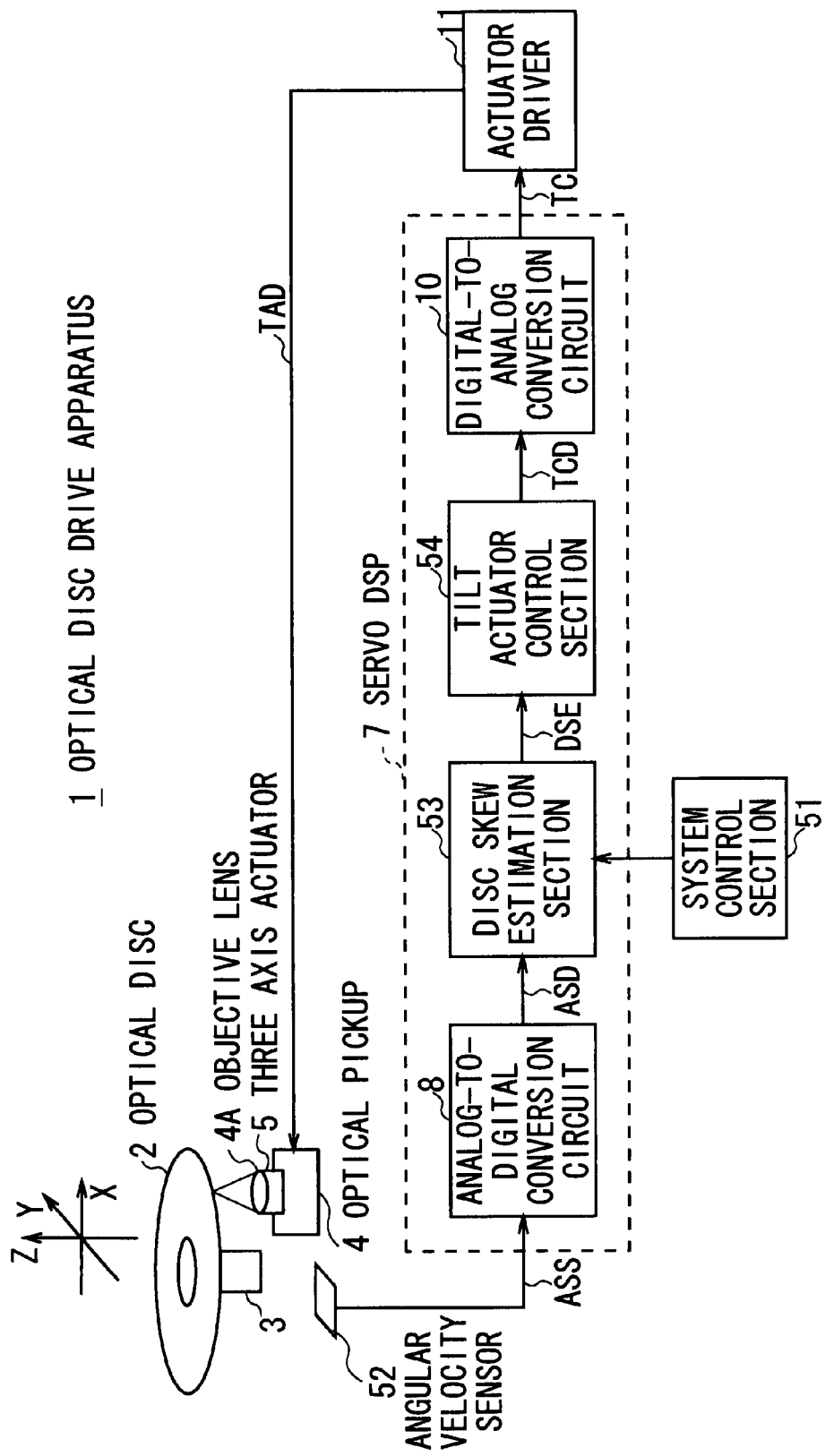
FIG. 1 is a schematic diagram illustrating the configuration of an optical disc drive apparatus according to an embodiment of the present invention.

In FIG. 1, an optical disc drive apparatus 1 includes a system control section 51 to take overall control of the apparatus 1. This allows the optical disc drive apparatus 1 to record and reproduce information from an optical disc 2. The optical disc drive apparatus 1, for example, is mounted on a portable camcorder (not shown) to record video signals on the optical disc 2.

The optical disc 2 is for example "Blu-ray Disc (BD) (Registered Trademark)" with 12 cm in diameter. In the optical disc drive apparatus 1, the optical disc 2 is chucked through its center and rotated by a spindle motor 3.

The optical disc drive apparatus 1 employs a Constant Linear Velocity (CLV) system. This controls the rotational speed of the optical disc 2 such that the linear velocity of a laser light following the track on the signal recording surface of the optical disc 2 is maintained at a constant speed.

The optical disc drive apparatus 1 operates in two modes: a standard speed mode, in which the linear velocity is a usual one specified by organizations or the like; and a double speed mode, in which the linear velocity is doubled compared to the standard speed mode. The double speed mode rotates the optical disc at high speed to double the speed of recording and reproducing.

An objective lens 4A of the optical pickup 4 collects the laser light emitted from a laser diode (not shown) via various optical components (not shown) and then irradiates it to the signal recording surface of the optical disc 2. A reflection light reflected from the signal recording surface of the optical disc 2 passes through various optical components (not shown) and then reaches a photodetector (not shown) of the optical pickup 4. The photodetector transforms it into a reception light signal.

On the signal recording surface of the optical disc 2 is formed a track in a spiral manner, in which each block memorizes a predetermined amount of information. Each block is given an address sequentially from the center of the optical disc 2 to its rim. To read the desired information, the optical disc drive apparatus 1 emits, based on the addresses, the optical beam toward a track (or a desired track) where the desired information is stored.

In reality, the optical disc drive apparatus 1 generates, based on the reception light signals, a focus error signal representing a difference between a focal position of the laser light and the signal recording surface of the optical disc 2 and a tracking error signal representing a difference between a position to which the laser light is emitted and the desired track. Based on the focus error signal and the tracking error signal, a three axis actuator 5 controls the objective lens 4A.

That is, the optical disc drive apparatus 1 moves the objective lens 4A close to or away from the optical disc 2 to decrease the focus error signal. In this manner, the optical disc drive apparatus 1 moves the objective lens 4A in a focus direction as a feedback control (or a focus control) such that the laser light is focused on the signal recording surface of the optical disc 2.

At the same time, the optical disc drive apparatus 1 moves the objective lens 4A toward the center or rim of the optical disc 2 to decrease the tracking error signal. In this manner, the optical disc drive apparatus 1 moves the objective lens 4A in a tracking direction as a feedback control (or a tracking control) such that the laser light follows the desired track.

By the way, the optical disc drive apparatus 1 roughly moves the optical pickup 4 in the tracking direction by a sled motor (not shown) and then performs the tracking control with the three axis actuator 5 such that the laser light is focused on the desired track.

In this manner, the optical disc drive apparatus 1 performs the focus control and the tracking control: The three axis actuator 5 of the optical pickup 4 controls the objective lens 4A such that the laser light is focused on the desired track on the signal recording surface of the optical disc 2.

Hereinafter, an X axis direction represents the tracking direction while a Z axis direction represents the focus direction. In addition, a Y axis is perpendicular to both the X and Z axes.

(2) Basic Principle of Disc Skew and Tilt Control

By the way, in the optical disc drive apparatus 1, the reflection light reflected by the optical disc 2 is received via various optical components (not shown) by a photodetector (not shown). Accordingly, it is desirable to emit the laser light in a direction perpendicular to the optical disc 2 such that the optical axis of the incident light corresponds to that of the reflection light, in order to eliminate aberration (such as coma aberration) and to improve optical characteristic.

However, since the optical disc drive apparatus 1 is mounted on the portable camcorder, an external force may be applied to it. The optical disc drive apparatus 1 rotates the optical disc 2 at high speed, causing Gyroscopic Precession for the optical disc 2.

Figure 2:
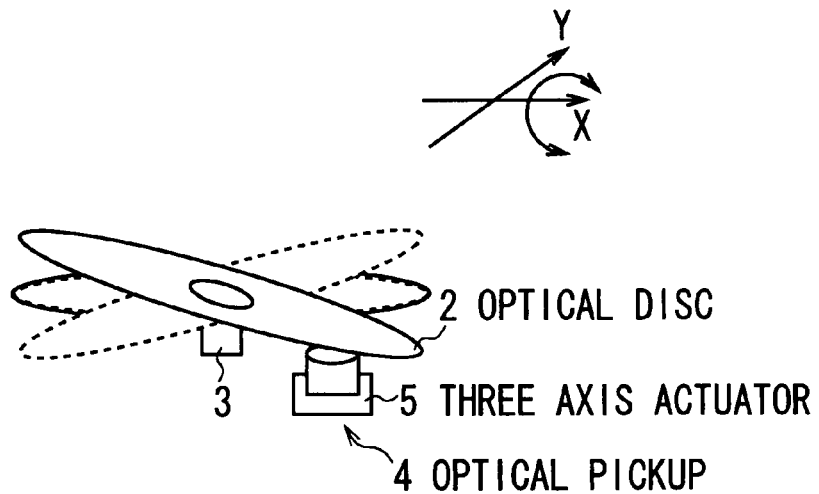
FIG. 2 is a schematic diagram illustrating the radial disc skews arising from angular velocities around a X axis.

For example as shown in FIG. 2, when an external force, or angular velocity, is applied to the rotating optical disc 2 in a direction of rotation around the X axis the direction of skew changes due to Coriolis force of Gyroscopic Precession, making an angle of 90 degrees with respect to the X axis. This causes a disc skew in a direction of rotation around the Y axis (This disc skew will be also referred to as a "radial disc skew").

Figure 3:
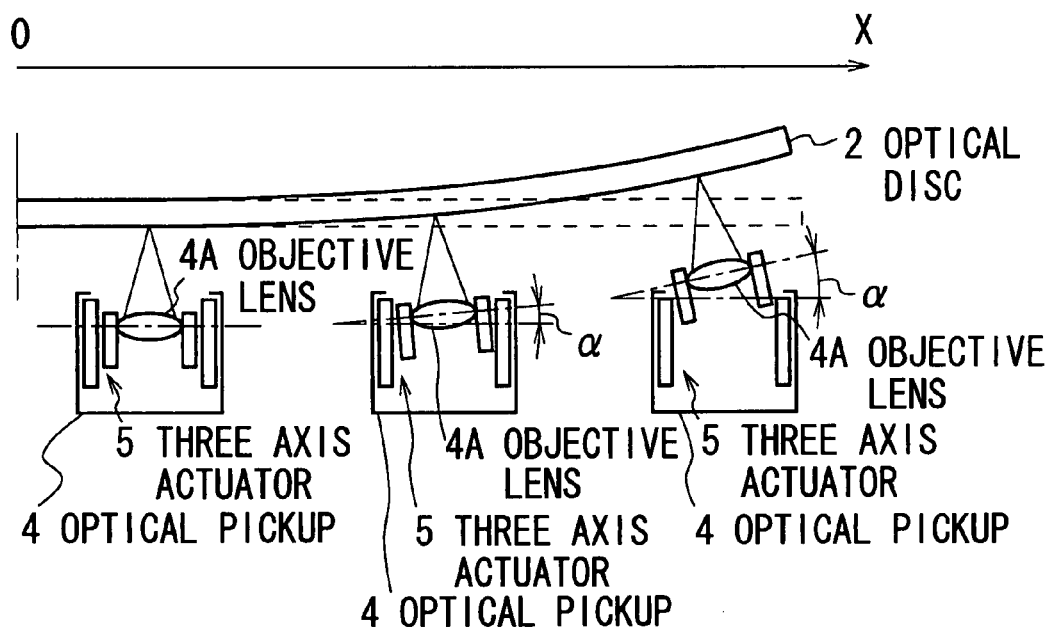
FIG. 3 is a schematic diagram illustrating the radial disc skews of an optical disc and adjustment of the tilt angle of an objective lens.

The optical disc drive apparatus 1 performs a tilt control when the radial disc skew occurs on the optical disc 2: as shown in FIG. 3, the three axis actuator 5 of the optical pickup 4 adjusts a tilt angle • of the objective lens 4A for the radial disc skew.

According to the principle of the tilt control, the tilt angle • of the objective lens 4 is appropriately adjusted for the radial disc skew. A tilt actuator control signal TC, a control signal supplied to the three axis actuator 5 for controlling the tilt direction changes according to the radial disc skew of the optical disc 2: the level of the tilt actuator control signal TC is proportional to the amount of the radial disc skew.

In addition, according to the principle of Gyroscopic Precession, the angular velocity around the X axis (FIG. 2), arising from the external force applied to the optical disc drive apparatus 1, and the radial disc skew of the optical disc 2 around the Y axis differ from each other in direction. However, it is expected that there would be correlation between the angular velocity and the radial disc skew.

That means that if the optical disc drive apparatus 1 performs the tilt control of the objective lens 4A by supplying to the three axis actuator 5 the tilt actuator control signal TC that changes according to the angular velocity around the X axis, the tilt angle • of the objective lens 4A may be appropriately adjusted for the radial disc skew. This may eliminate the radial disc skew, resulting in improvement of recording and reproducing characteristic.

Accordingly, the optical disc drive apparatus 1 may be equipped with an angular velocity sensor for the direction of rotation around the X axis. The correlation between the angular velocity AC, detected by the angular velocity sensor, and the radial disk skew of the optical disc 2 may be represented by a predetermined coefficient (referred to as a "radial disc skew coefficient k") when the external force is applied to the optical disc drive apparatus 1 that is rotating the optical disc 2.

In other words, after it is multiplied by the angular velocity AS, the radial disc skew coefficient k may represent an estimate value of the radial disc skew.

On the other hand, the optical disc 2 is a thin disc made from resin with a diameter of 120 mm and a thickness of 1.2 mm. In the optical disc drive apparatus 1, the optical disc 2 is chucked through its center. As shown in FIG. 3, the optical disc 2 is bent when an external force is applied. The radial disc skew around the rim of the optical disc 2 is larger than that of the center section of the optical disc 2.

Accordingly, even if the same external force is applied to the optical disc drive apparatus 1, the appropriate tilt angle • of the objective lens 4A may vary according to the position of the optical pickup 4 (The position of the optical pickup 4 will be also referred to as a "disc radial position r").

The radial disc skew coefficient k, representing the correlation between the angular velocity AS and the radial disc skew of the optical disc 2, may therefore vary according to the disk radial position r.

In addition, the rotational speed of the optical disc 2 may change according to the speed modes. Moreover, Coriolis force of Gyroscopic Precession may vary according to the speed modes even when the same external force is applied. This means that the radial disc skew coefficient k, representing the correlation between the angular velocity AS and the radial disk skew of the optical disc 2, may change according to the speed modes.

FIGS. 4A and 4B show the result of the following experiment: the radial disc skew coefficient k is calculated while changing the position of the optical pickup 4 (or the disc radial position r) in the standard speed mode and the double speed mode. In this case, the disc radial position r has been sequentially changed by 0.1 mm in a range of 24 mm to 58 mm.

Figure 5:
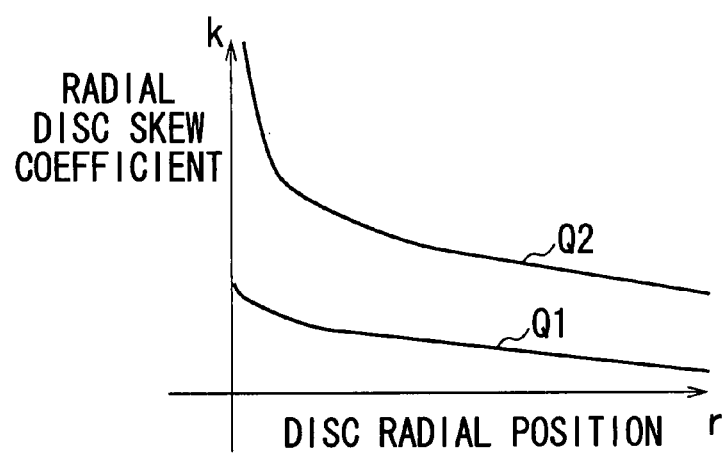
FIG. 5 is a schematic diagram illustrating the correlation between the disc radial positions and the radial disc skew coefficients.

FIG. 5 is a graph illustrating the correlation between the disc radial position r and the radial disc skew coefficient k, based on the result of FIGS. 4A and 4B. A characteristic curve Q1 represents the standard speed mode while a characteristic curve Q2 represents the double speed mode.

The radial disc skew coefficient k nonlinearly changes according to the disc radial position r due to the combination of the following effects: the rotation speed of the optical disc 2 varies according to the disc radial position r of the optical pickup 4 because the optical disc drive apparatus 1 employs the CLV system; and the optical disc 2 gets bent, the radial disc skew changing in different disc radial positions. Accordingly, the characteristic curves Q1 and Q2 may not be able to be represented by simple functions or equations.

The optical disc drive apparatus 1 selects, out of those radial disc skew coefficients k, an appropriate one for the speed mode and the disc radial position r. The optical disc drive apparatus 1 subsequently multiplies the selected radial disc skew coefficient k by the angular velocity AS detected by the angular sensor.

This offers the relatively precise estimate value of the radial disc skew because the speed modes and the disc radial position r have been taken into consideration.

The optical disc drive apparatus 1 then calculates the tilt actuator control signal TC based on the estimate value of the radial disc skew. Accordingly, the three axis actuator 5 can appropriately adjust the tilt angle • of the objective lens 4A to deal with the radial disc skew.

In this manner, the optical disc drive apparatus 1 may be designed to memorize those radial disc skew coefficients k (shown in FIGS. 4A and 4B). In this case, when the angular velocity sensor detects the angular velocity AS around the X axis, the optical disc drive apparatus 1 reads out the radial disc skew coefficient k corresponding to the speed mode and the disc radial position r at that time and then generates the tilt actuator control signal TC by multiplying the angular velocity AS by the radial disc skew coefficient k. The optical disc drive apparatus 1 therefore can perform the tilt control with high precision.

(3) Tilt Control Based on Angular Velocities (3-1) Configuration of a Servo Control System The optical disc drive apparatus 1 (FIG. 1) performs, following the above principle, the tilt control based on the angular velocity caused by the external force.

In reality, as shown in FIG. 3, the tilt angle of the objective lens 4A of the optical pickup 4 can be adjusted in a direction of rotation around the Y axis.

The optical disc drive apparatus 1 (FIG. 1) is equipped with an angular velocity sensor 52 to detect the angular velocity around the X axis. The angular velocity sensor 52 detects the angular velocity of the external force applied in a direction of rotation around the X axis to generate an angular velocity signal ASS which is then supplied to a servo DSP 7.

The servo DSP 7 executes a predetermined operation control program to perform the servo control (or the tilt control) as well as the above focus control and tracking control.

An analog-to-digital conversion circuit 8 of the servo DSP 7 converts the angular velocity signal ASS, supplied from the angular velocity sensor 52, into digital angular velocity data ASD which is then supplied to a disc skew estimation section 53.

The disc skew estimation section 53 acquires from the system control section 51 address information AI, indicating a position from which the information is being read by the optical pickup 4, and speed mode information MI, representing the current speed mode for the optical disc 2. The disk skew estimation section 53 then produces, based on the acquired information and the angular velocity data ASD, the estimate value of the radial disc skew of the optical disc 2 as a disc skew estimate value DSE, which is then supplied to a tilt actuator control section 54 (described later).

The tilt actuator control section 54 generates, based on the disc skew estimate value DSE, tilt actuator control data TCD to control the three axis actuator 5 in the tilt direction. The tilt actuator control section 54 then supplies the tilt actuator control data TCD to a digital-to-analog conversion circuit 10. The digital-to-analog conversion circuit 10 converts the tilt actuator control data TCD into an analog tilt actuator control signal TC which is then supplied to an actuator driver 11.

The actuator driver 11 generates a voltage based on the tilt actuator control signal TC as a tilt actuator drive signal TAD which is then supplied to the three axis actuator 5 to adjust the tilt angle • of the objective lens 4A (FIG. 3).

In this manner, the servo DSP 7 of the optical disc drive apparatus 1 generates the tilt actuator control signal TC based on the address information AI, the speed mode information MI and the angular velocity signal AS. The optical disc drive apparatus 1 performs, in accordance with the tilt actuator control signal TC, the tilt control using the three axis actuator 5.

Figure 6:
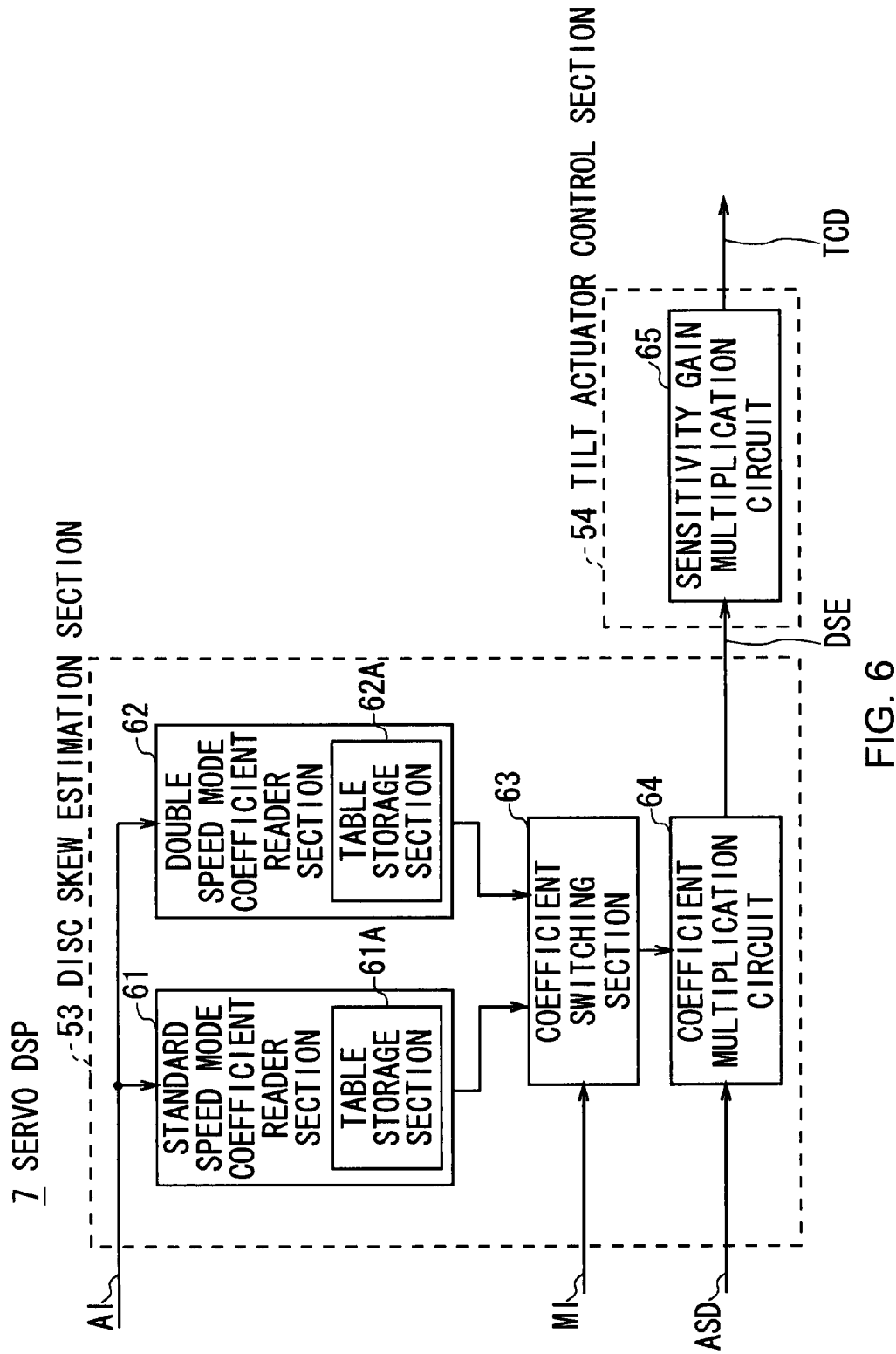
FIG. 6 is a block diagram illustrating a disc skew estimation section and a tilt actuator control section.

(3-2) Configuration of the Disc Skew Estimation Section and the Tilt Actuator Control Section With reference to FIG. 6, the circuit configuration of the disc skew estimation section 53 and the tilt actuator control section 54 will be described.

The disc skew estimation section 53 receives the address information AI from the system control section 51 and then supplies the address information AI to a standard speed mode coefficient reader section 61 and a double speed mode coefficient reader section 62.

The standard speed mode coefficient reader section 61 is equipped with a table storage section 61A that has stored a radial disc skew coefficient table TBL1 in which the correlation between the disc radial positions r and the radial disc skew coefficients k for the standard speed mode (as shown in FIG. 4A) is described. Similarly, the double speed mode coefficient reader section 62 is equipped with a table storage section 62A that has stored a radial disc skew coefficient table TBL2 in which the correlation between the disc radial positions r and the radial disc skew coefficients k for the double speed mode (as shown in FIG. 4B) is described.

The standard speed mode coefficient reader section 61 performs a conversion process to calculate the disc radial position r from the address information AI. The standard speed mode coefficient reader section 61 subsequently reads out from the standard speed models radial disc skew coefficient table TBL1 the radial disc skew coefficient k corresponding to the calculated disc radial position r, which is then supplied to a coefficient switching circuit 63 as a standard speed mode radial disc skew coefficient k1.

Similarly, the double speed mode coefficient reader section 62 performs a conversion process to calculate the disc radial position r from the address information AI. The double speed mode coefficient reader section 62 subsequently reads out from the double speed models radial disc skew coefficient table TBL2 the radial disc skew coefficient k corresponding to the calculated disc radial position r, which is then supplied to the coefficient switching circuit 63 as a double speed mode radial disc skew coefficient k2.

Based on the speed mode information MI supplied from the system control section 51, the coefficient switching section 63 recognizes the current speed mode, the standard speed mode or the double speed mode, and then selects, based on the recognized speed mode, either the standard speed mode radial disc skew coefficient k1 or the double speed mode radial disc skew coefficient k2, which is then supplied to a coefficient multiplication circuit 64 as a radial disc skew coefficient k.

The coefficient multiplication circuit 64 therefore recognizes the disc radial position r of the optical pickup 4 at this time and the radial disc skew coefficient k corresponding to the current speed mode.

The coefficient multiplication circuit 64 multiplies the angular velocity data ASD by the radial disc skew coefficient k to obtain the disc skew estimate value DSE, which is then supplied to the tilt actuator control section 54.

In this manner, the disc skew estimation section 53 selects, based on the address information AI and speed mode information MI supplied from the system control section 51, one of the radial disc skew coefficients k corresponding to the position of the optical pickup 4 and the speed mode at that time. Using the radial disc skew coefficient k and the angular velocity data ASD at this time, the disc skew estimation section 53 estimates the degree of the radial disc skew (or the disk skew estimate value DSE).

A sensitivity gain multiplication circuit 65 of the tilt actuator control section 54 multiplies the disc skew estimate value DSE by a predetermined sensitivity gain coefficient to produce the tilt actuator control data TCD, which is then supplied to the digital-to-analog conversion circuit 10 (FIG. 1).

In this manner, the tilt actuator control section 54 calculates the tilt actuator control data TCD to adjust the tilt angle • of the objective lens 4A in order to deal with the radial disc skew.

After the tilt actuator control data TCD is converted into the analog tilt actuator control signal TC, the actuator driver 11 (FIG. 1) of the optical disc drive apparatus 1 produces the tilt actuator drive signal TAD based on the tilt actuator control signal TC, which is then supplied to the three axis actuator 5. The three axis actuator 5 therefore adjusts the tilt angle • of the objective lens 4A (FIG. 3) in order to deal with the radial disc skew.

(4) Operation and Effect

The optical disc drive apparatus 1 has previously calculated the radial disc skew coefficients k for each speed mode and for each disc radial position r of the optical pickup 4: The radial disc skew coefficients k represent the correlation between the angular velocity data ASD, which the angular velocity sensor 52 detects, and the tilt actuator control signal TC, which is used by the three axis actuator 5 to control the objective lens 4A in the tilt direction. Those standard speed mode's coefficients k and double speed models coefficients k have been stored in the table storage section 61A of the standard speed mode coefficient reader section 61 and the table storage section 62A of the double speed mode coefficient reader section 62 as the radial disc skew coefficient tables TBL1 and TBL2, respectively.

The optical disc drive apparatus 1 supplies, when recording or reproducing the information from the optical disc 2, to the disc skew estimation section 53 the angular velocity data ASD representing the angular velocity around the X axis detected by the angular velocity sensor 52.

The disc skew estimation section 53 of the optical disc drive apparatus 1 also reads out the radial disc skew coefficient k corresponding to the disc radial position r of the optical pickup 4 and speed mode at this time, and then produces the disc skew estimate value DSE by multiplying the radial disk skew coefficient k by the angular velocity data ASD.

The tilt actuator control section 54 of the optical disc drive apparatus 1 generates the tilt actuator control data TCD based on the disc skew estimation value DSE, which is then transformed into the analog tilt actuator control signal TC. The actuator drive 11 produces the tilt actuator drive signal TAD based on the tilt actuator control signal TC, which is then supplied to the three axis actuator 5 to perform the tilt control.

In this manner, the optical disc drive apparatus 1 produces the tilt actuator control data TCD after calculating the disc skew estimate value DSE based on the angular velocity data ASD. This allows the optical disc drive apparatus 1 to appropriately deal with the radial disc skew of the optical disc 2 arising from Gyroscopic Precession by adjusting the objective lens 4. Thus, the optical disc drive apparatus 1 offers good performance in terms of recording and reproducing information from the optical disc 2.

For example, the optical disc drive apparatus 1 is not equipped with a relatively large size skew sensor because the radial disc skew can be estimated from the radial disc skew coefficients k and the angular velocity signal ASS detected by the relatively small size angular velocity sensor 52. Accordingly, the optical pickup 4 and the optical disc drive apparatus 1 can be downsized.

As mentioned above, the optical disc drive apparatus 1 has previously calculated the radial disc skew coefficients k for each disc radial position r of the optical pickup 4. The optical disc drive apparatus 1 selects one of those radial disc skew coefficients k in accordance with the disc radial position r at that time. Accordingly, the tilt angle • of the objective lens 4 can be adjusted to deal with the radial disk skew, the degree of which is different at the different disc radial positions r due to the shape of the optical disc 2 bent by an external force (as shown in FIG. 3).

The correlation between the angular velocity data ASD and the radial disc skew may also vary according to the disc radial position r because the rotational speed of the optical disc 2 is different at the different disc radial positions r of the optical pickup 4 rotated by the CLV system. However, in this embodiment, the radial skew coefficients k for each disc radial position r have been previously calculated based on the CLV optical disc drive apparatus 1 in which the rotational speed of the optical disc 2 is different at the different disc radial positions r. Accordingly, the optical disc drive apparatus 1 can obtain the reasonable disc skew estimate value DSE despite wherever the optical pickup 4 is placed.

As mentioned above, the optical disc drive apparatus 1 reads out, in accordance with the speed mode at that time, either the standard speed mode radial disc skew coefficient k1 or the double speed mode radial disc skew coefficient k2 as the radial disc skew coefficient k, from the standard speed mode's radial disc skew coefficient table TBL1 or the double speed models radial disc skew coefficient table TBL2. Accordingly, the optical disc drive apparatus 1 can produce the appropriate tilt actuator control data TCD even if the rotational speed of the optical disc 2 varies according to the speed modes or if Coriolis force caused by Gyroscopic Precession and the disc skew change.

According to the above configuration, the optical disc drive apparatus 1 has previously calculated the radial disc skew coefficients k for each speed mode and for each disc radial position r of the optical pickup 4: The radial disc skew coefficients k represent the correlation between the angular velocity data ASD and the tilt actuator control signal TC. The optical disc drive apparatus 1 selects one of the radial disc skew coefficients k corresponding to the disc radial position r and speed mode at that time. The optical disc drive apparatus 1 then multiplies the selected radial disc skew coefficient k by the angular velocity data ASD to obtain the disc skew estimate value DSE. The optical disc drive apparatus 1 subsequently produces the tilt actuator control data TCD based on the disc skew estimate value DSE. This enables the three axis actuator 5 to control the tilt angle of the objective lens 4A in accordance with the radial disc skew of the optical disc 2 arising from Gyroscopic Precession. Thus, the optical disc drive apparatus 1 presents good performance in terms of recording and reproducing information from the optical disc 2.

(5) Other Embodiments

In the above-noted embodiments, the radial disc skew coefficients k are stored in the form of tables, the radial disc skew coefficient tables TBL1 and TBL2. However, the present invention is not limited to this. If the characteristic curves Q1 and Q2 (FIG. 5) can be approximately expressed in mathematical formulas along with the disc radical positions r, the optical disc drive apparatus 1 may memorize the mathematical formulas for each speed mode in order to calculate the radial disc skew coefficient k from the disc radial position r.

Moreover, in the above-noted embodiments, the radial disc skew coefficient k is directly read from the radial disc skew coefficient tables TBL1 and TBL2 (FIG. 4). However, the present invention is not limited to this. If the radial disc skew coefficients tables TBL1 and TBL2 do not include a certain disc radial position r (such as 24.15), the optical disc drive apparatus 1 may calculate the radial disc skew coefficient k of that position r from the data of the adjacent disc radial positions r (such as 24.1 and 24.2) using the linear interpolation method.

Furthermore, in the above-noted embodiments, the correlation between the angular velocity data ASD and the radial skew of the optical disc 2 is represented as the radial disc skew coefficients k, which are stored in the radial disc skew coefficient tables TBL1 and TBL2. However, the present invention is not limited to this. The correlation between the angular velocity data ASD and the actuator control data TCD may be represented as the coefficients to be stored in the radial disc skew coefficient tables.

Furthermore, in the above-noted embodiments, the tilt angle of the objective lens 4A can be adjusted in the direction of rotation around the Y axis. In addition, the disc skew estimate value DSE of the radial direction is calculated using the radial disc skew coefficient k. However, the present invention is not limited to this. Alternatively, the tilt angle of the objective lens 4A may be adjusted in the direction of rotation around the X axis while the angular velocity around the Y axis is detected. In this case, tangential skew coefficients k of the tangential direction may have been previously calculated. Accordingly, disc skew estimate values in the tangential direction may be calculated based on the angular velocity around the Y axis and the tangential skew coefficients k. This method may be used along with the method of the above-noted embodiment.

Furthermore, in the above-noted embodiment, the optical disc drive apparatus 1 supports two speed modes: the standard speed mode and the double speed mode. In addition, the radial disc skew coefficients k are memorized in the radial disc skew coefficient tables TBL1 and TBL2. However, the present invention is not limited to this. The optical disc drive apparatus 1 may support only one speed mode, or three or more speed modes. In this case, those radial disc skew coefficients k may be stored in one radial disc skew coefficient table, or in three or more radial disc skew coefficient tables, respectively.

Furthermore, in the above-noted embodiments, the optical disc drive apparatus 1 employs the CLV system to keep the linier velocity of the rotating optical disc 2 at constant level. However, the present invention is not limited to this. The method according to the above-noted embodiment may be applied to an optical disc drive apparatus that employs the Constant Angular Velocity (CAV) system to rotate the optical disc 2 at constant speed.

Furthermore, in the above-noted embodiments, the optical disc drive apparatus 1 is incorporated in the portable camcorder. However, the present invention is not limited to this. The optical disc drive apparatus 1 may be incorporated in a portable BD player, a BD player mounted on vehicles, a stationary BD recorder or the like.

Furthermore, instead of the BD format, the optical disc 2, supported by the optical disc drive apparatus 1, may employ other formats such as Digital Versatile Disc (DVD) or Compact Disc (CD). The optical disc may be 80 mm or the like, instead of 120 mm, in diameter. In this case, the structure, material, diameter and the like of these optical discs may differ from the optical disc 2, causing different types of radial disc skews arising from Gyroscopic Precession. Accordingly, the radial disc skew coefficient tables for each optical disc may be previously produced so that an appropriate radial disc skew coefficient k can be acquired from these tables after detecting the type or diameter of the optical disc.

Furthermore, in the above-noted embodiment, the optical disc drive apparatus 1 includes: the optical pickup 4; the three axis actuator 5, which is equivalent to a drive section; the angular velocity sensor 52, which is equivalent to an angular velocity detection section; the table storage sections 61A and 62A, which are equivalent to storage means; the disc skew estimation section 53, which is equivalent to a skew estimation section; and the tilt actuator control section 54 and actuator driver 11, which are equivalent to a drive signal generation section. However, the present invention is not limited to this. The optical disc drive apparatus may be configured in a different manner, including the optical pickup, the drive section, the angular velocity detection section, the storage means, the skew estimation section and the drive signal generation section.

The method according to an embodiment of the present invention can be applied to an optical disc drive apparatus supporting such formats as "Blu-ray Disc (Registered Trademark)", "HD DVD (Registered Trademark)" or the like.

It should be understood by those skilled in the art that various modifications, combinations, sub-combinations and alterations may occur depending on design requirements and other factors insofar as they are within the scope of the appended claims or the equivalents thereof.

The invention claimed is:

1. An optical disc drive apparatus comprising:
    an optical pickup that moves along a transportation shaft provided along a radial direction of a rotatable optical disc and picks up reflected light after emitting an optical beam via an objective lens to a signal recording surface of the optical disc;
    a drive section that controls the objective lens to adjust an angle of the optical beam emitted to the optical disc;
    an angular velocity detection section that detects an angular velocity around the transportation shaft when an external force is applied;
    storage means for previously storing coefficients from which the degree of skew of the optical disc around a virtual axis perpendicular to the transportation shaft is calculated using the angular velocity, the skew of the optical disc arising from the external force;
    a skew estimation section that calculates a skew estimate value of the optical disc by multiplying the coefficient acquired from the storage means by the angular velocity detected by the angular velocity detection section; and
    a drive signal generation section that generates a drive signal based on the skew estimate value and supplies the drive signal to the drive section to adjust the angle of the emitted optical beam in accordance with the skew estimate value.

2. The optical disc drive apparatus according to claim 1, wherein:
    the storage means previously stores the coefficients for each disc radial position of the optical pickup with respect to the optical disc; and
    the skew estimation section acquires from the storage means the coefficient corresponding to the disc radial position.

3. The optical disc drive apparatus according to claim 1, wherein
    a rotational speed of the optical disc is controlled by Constant Linear Velocity (CLV) system.

4. The optical disc drive apparatus according to claim 1, wherein
    the optical disc is rotated in one of speed modes including a standard speed mode in which the rotational speed or predetermined linear speed of the optical disc is maintained;
    the storage means previously stores the coefficients for each speed mode; and
    the skew estimation section acquires from the storage means the coefficients corresponding to the speed mode and calculates the skew estimate value of the optical disc by multiplying the acquired coefficient by the angular velocity detected by the angular velocity detection section.

5. A servo control method of an optical disc drive apparatus comprising:
    an angular velocity detection step of detecting, when an external force is applied, an angular velocity around a transportation shaft on which moves an optical pickup in a radial direction of a rotatable optical disc, the optical pickup being used to pick up reflected light after emitting an optical beam via an objective lens to a signal recording surface of the optical disc;
    a skew estimation step of calculating a skew estimate value of the optical disc by multiplying a coefficient acquired from storage means by the angular velocity detected by the angular velocity detection step, the storage means previously storing the coefficients from which the degree of skew of the optical disc arising from the external force around a virtual axis perpendicular to the transportation shaft is calculated using the angular velocity; and
    a drive signal generation step of generating a drive signal based on the skew estimate value and supplies the drive signal to a drive section that controls the objective lens to adjust an angle of the optical beam emitted to the optical disc, to adjust, in accordance with the skew estimate value, the angle of the emitted optical beam as a servo control.

6. An optical disc drive apparatus comprising:
    an optical pickup that moves along a transportation shaft provided along a radial direction of a rotatable optical disc and picks up reflected light after emitting an optical beam via an objective lens to a signal recording surface of the optical disc;
    a drive section that controls the objective lens to adjust an angle of the optical beam emitted to the optical disc;
    an angular velocity detection section that detects an angular velocity around the transportation shaft when an external force is applied;
    a storage section that previously stores coefficients from which the degree of skew of the optical disc around a virtual axis perpendicular to the transportation shaft is calculated using the angular velocity, the skew of the optical disc arising from the external force;

a skew estimation section that calculates a skew estimate value of the optical disc by multiplying the coefficient acquired from the storage section by the angular velocity detected by the angular velocity detection section; and a drive signal generation section that generates a drive signal based on the skew estimate value and supplies the drive signal to the drive section to adjust the angle of the emitted optical beam in accordance with the skew estimate value.

* * * * *